(No Model.) 2 Sheets—Sheet 1.
J. SUTTER.
TIDE AND CURRENT WHEEL.
No. 475,632. Patented May 24, 1892.
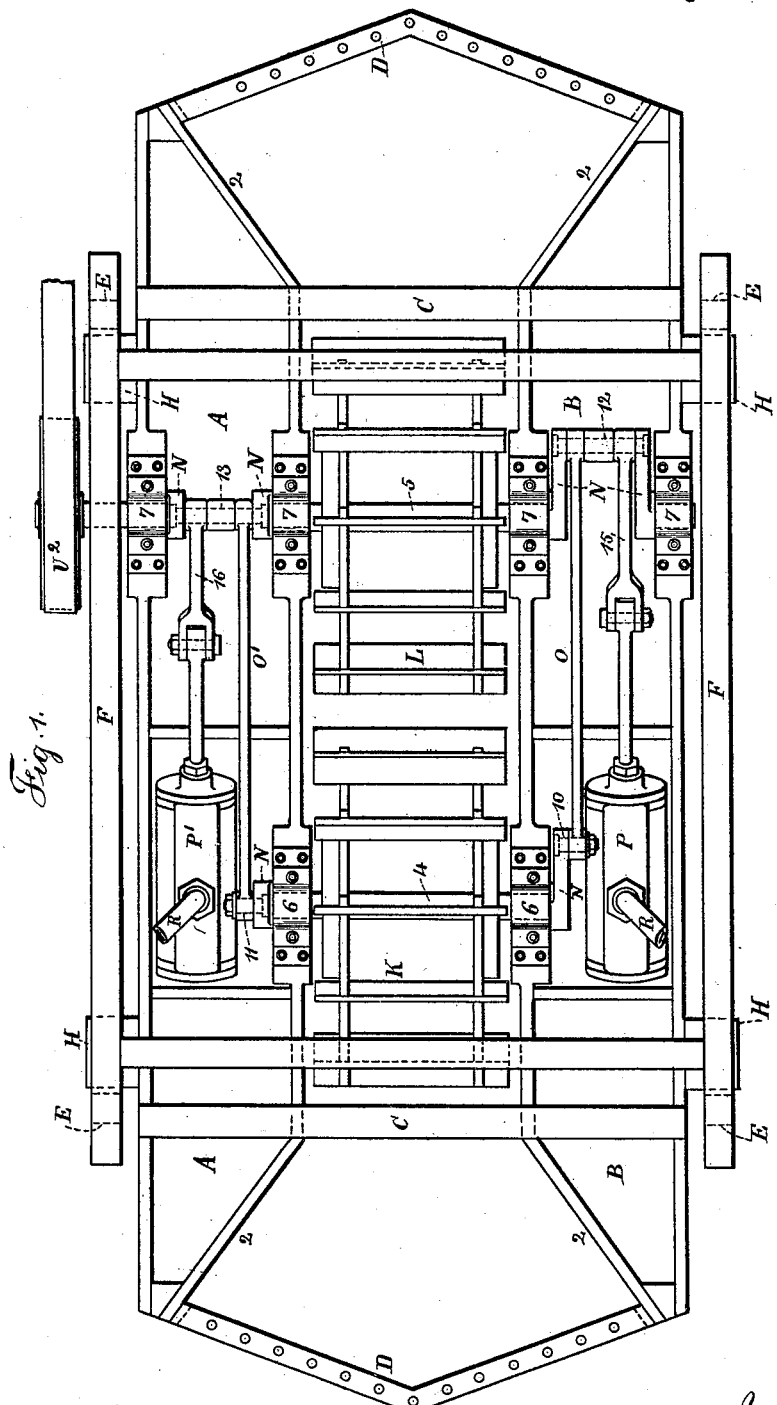
Witnesses:
J. Staib
Chas. H. Smith
Inventor:
Joseph Sutter
per Lemuel W. Serrell
Atty (No Model.) 2 Sheets—Sheet 2.
J. SUTTER.
TIDE AND CURRENT WHEEL.
No. 475,632. Patented May 24, 1892.
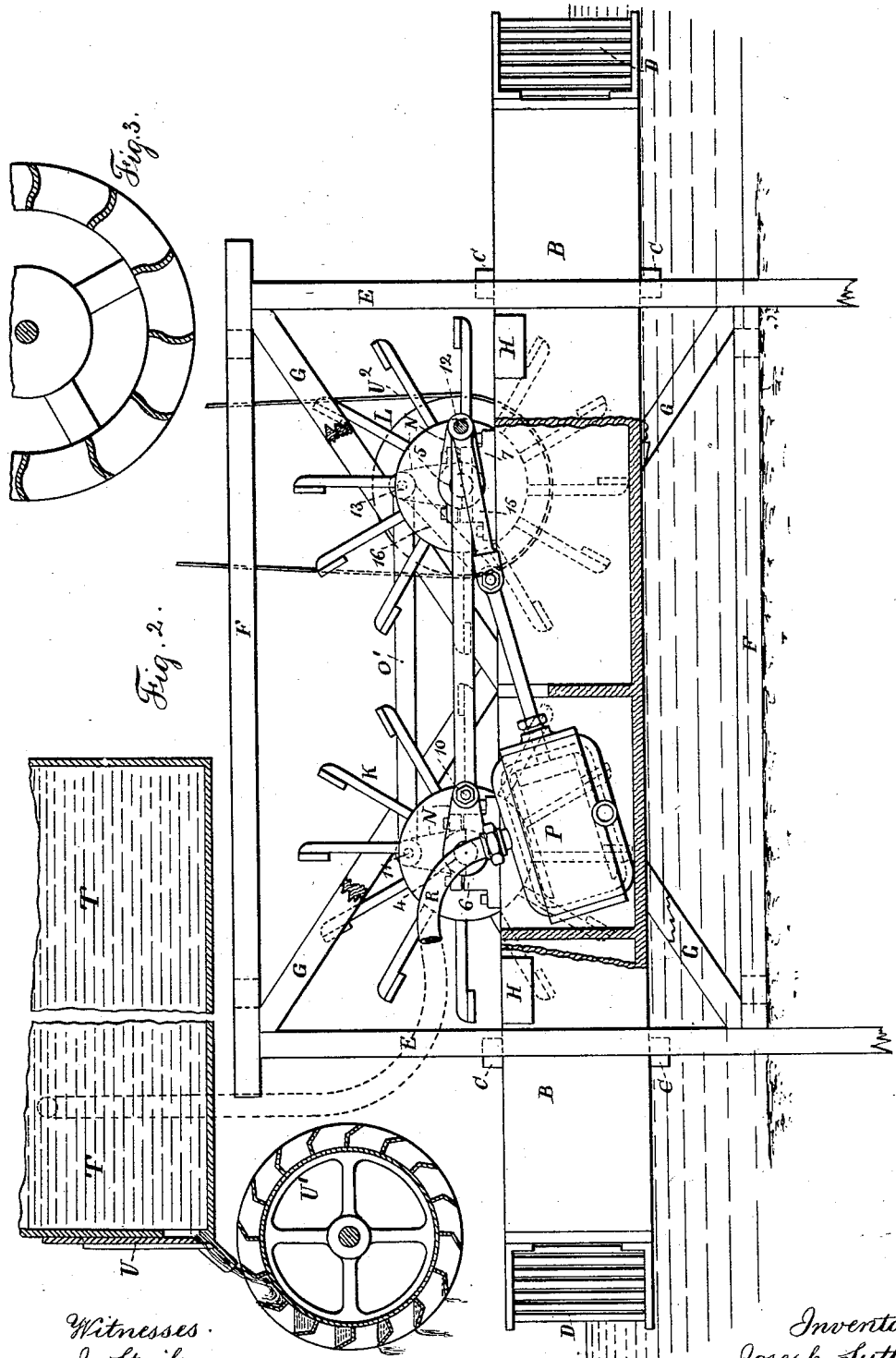
Witnesses
J. Staib
Chas. H. Smith
Inventor:
Joseph Sutter,
per Lemuel W. Serrell atty

UNITED STATES PATENT OFFICE.

JOSEPH SUTTER, OF NEW YORK, N. Y.

TIDE AND CURRENT WHEEL.

SPECIFICATION forming part of Letters Patent No. 475,632, dated May 24, 1892.

Application filed November 24, 1890. Serial No. 372,403. (No model.)

*To all whom it may concern:*

Be it known that I, JOSEPH SUTTER, a citizen of the United States, residing in the city, county, and State of New York, have invented a Tide and River Water-Power, of which the following is a specification.

This invention is made with reference to utilizing the power of running water regardless of the height of the water, so as to obtain uniformity of action and to employ such power in propelling pumps for irrigation and other machinery; and the invention consists in the combination of devices hereinafter described and claimed.

In the drawings, Figure 1 is a plan view of the apparatus. Fig. 2 is an elevation partially in section, and Fig. 3 shows a portion of a wheel with curved buckets.

I make use of two floats A and B, the ends of which are inclined, as shown at 2, and these floats are connected by suitable cross-timbers C, and there are at the ends of the floats fenders D, that are inclined or pointed in the middle portions and provided with slats for preventing floating substances passing through between the floats A and B, and these fenders are permanently connected to the floats and rise and fall with them as the tide rises and falls or as the current of the river may rise or fall, and a frame-work is provided for holding the floats A B in position, the same consisting of the vertical posts or piles E, connected together by beams F and suitable braces G, by which the frame-work is rigidly held in position, and the posts E are of a sufficient distance apart for the floats A B to be received between them and rise and fall freely by the rise and fall of the water, and there are slide-blocks H fastened upon the outer sides of the floats A and B and adjacent to the vertical posts E, which slide-blocks retain the floats and the parts connected with them properly in position between the vertical posts E.

I make use of water-wheels between the floats A B. Preferably there are two of these water-wheels, as shown at K L, the shafts 4 and 5 of which are supported in journal-boxes 6 and 7. Upon the top edges of the floats A and B and upon the ends of the shafts 4 and 5 are cranks or disks N with crank-pins 10 11 12 13 connected together in pairs by the connecting-rods O O', and these crank-pins should be at about ninety degrees apart, so as to render the movements of the machinery as nearly equal as possible, and to such cranks the pumps P P' are connected by rods 15 16.

It is now to be understood that the apparatus is to be located in such a manner that the currents of water will run through between the floats A and B, and these floats are to be immersed in the water to a greater or less extent, in order that the paddles or plates of the wheels may be acted upon to the best advantage by the passing current of water, and thereby the wheels will be rotated and the machinery connected with them will be driven. In cases where the rise and fall of the tide is made use of it is generally preferably to locate the apparatus at an opening in a dike or bank intervening between the ocean or bay and a pond or bay, so that the water passes through the opening and beneath the wheels to drive them in one direction as the tide rises and in the other direction as the tide falls.

I do not limit myself to the character of mechanism driven by these water-wheels; but I have represented flexible tubes or connections R that pass away from the pumps to lead the water to any suitable reservoir or to ditches for irrigating purposes.

It is advantageous for current-wheels to make the buckets with curved edges, as seen in Fig. 3, so that in leaving the water the splashing is prevented, because the curved edge rises nearly vertically from the water. With current-wheels in rivers the water is running constantly in one direction, and there will be little or no cessation of its action, but with tide-wheels there is a period of quiescence at high and low tides and the tide-wheel can only be operated advantageously for about three hours consecutively. In these cases the power for driving the machinery of a mill may be taken by belts or gearing from the shaft of either wheel and the surplus power be used on the pumps to elevate water into a holder or reservoir of suitable size, as represented at T, and from which the water may be allowed to run by raising a gate U to act upon an overshot water-wheel U' or other water-motor to continue the rotation of the machinery in the mill during the time that the tide-power is inactive, the belt or other connection at $U^2$ to the machinery of the mill being slipped or disconnected during this time from the water-wheels K L. By placing the cranks of the water-wheels at right angles to each other, as shown, the power of such water-wheels is applied to the pumps to the best advantage, because while one crank is passing the dead-center the other is acting to move the piston of the other pump the most rapidly. Hence the flow of water from the two pumps will be nearly uniform.

The frame E F G may be anchored in a river or stream, or the frame may be weighted with stone or otherwise held in position.

I claim as my invention—

The combination, with the stationary frames having vertical posts E, of two floats between the frames and guided by such posts as the water may rise or fall, connections between such floats and fenders at the ends of the water-channel between the floats, two water-wheels in such channel and their shafts and bearings upon such floats, and pumps within the floats actuated by the water-wheels, and an elevated reservoir receiving water from the pumps, and a motor actuated by the water from the reservoir for obtaining power when the tide or water wheels are quiescent, substantially as specified.

Signed by me this 18th day of November, 1890.

JOSEPH SUTTER.

Witnesses:
  GEO. T. PINCKNEY,
  WILLIAM G. MOTT.